US012576846B2

(12) United States Patent
Cao et al.

(10) Patent No.: US 12,576,846 B2
(45) Date of Patent: Mar. 17, 2026

(54) VEHICLE INCREMENTAL MOVEMENT SYSTEM

(71) Applicant: Ford Global Technologies, LLC, Dearborn, MI (US)

(72) Inventors: Bang Kim Cao, Northville, MI (US); Zubair Feroz, Dearborn, MI (US); Thirumal Nagadi, Troy, MI (US); Joseph Jay Torres, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 139 days.

(21) Appl. No.: 18/594,389

(22) Filed: Mar. 4, 2024

(65) Prior Publication Data

US 2025/0276691 A1 Sep. 4, 2025

(51) Int. Cl.
| | |
|---|---|
| *B60W 30/18* | (2012.01) |
| *B60W 10/08* | (2006.01) |
| *B60W 10/184* | (2012.01) |
| *B60W 50/00* | (2006.01) |

(52) U.S. Cl.
CPC ....... B60W 30/18054 (2013.01); *B60W 10/08* (2013.01); *B60W 10/184* (2013.01); *B60W 50/00* (2013.01); *B60W 2050/0026* (2013.01); *B60W 2510/20* (2013.01); *B60W 2520/04* (2013.01); *B60W 2710/08* (2013.01); *B60W 2710/18* (2013.01)

(58) Field of Classification Search
CPC .......... B60W 30/18054; B60W 10/08; B60W 10/184; B60W 50/00; B60W 2050/0026; B60W 2510/20; B60W 2520/04; B60W 2710/08; B60W 2710/18; B60W 30/06
See application file for complete search history.

(56) References Cited

U.S. PATENT DOCUMENTS

| | | | |
|---|---|---|---|
| 4,796,189 A * | 1/1989 | Nakayama ........... | G01C 21/367 73/178 R |
| 8,169,340 B2 | 5/2012 | Oyobe et al. | |
| 10,336,318 B2 | 7/2019 | Aich et al. | |
| 10,494,024 B2 | 12/2019 | Urhahne | |
| 2005/0137769 A1* | 6/2005 | Takamatsu ................ | B60T 7/22 701/1 |
| 2013/0066509 A1* | 3/2013 | Nakamura .......... | B60L 15/2063 701/22 |
| 2016/0236680 A1 | 8/2016 | Lavoie et al. | |
| 2018/0225946 A1* | 8/2018 | Kalokitis ............... | G01R 29/12 |
| 2018/0245945 A1* | 8/2018 | Diaz .................... | G01C 22/02 |
| 2019/0322266 A1* | 10/2019 | Fukushiro ............. | B60W 20/10 |
| 2024/0126279 A1* | 4/2024 | Patel ................. | B62D 15/0285 |
| 2024/0344836 A1* | 10/2024 | Diamond ........... | G01C 21/3822 |

* cited by examiner

*Primary Examiner* — Sze-Hon Kong
(74) *Attorney, Agent, or Firm* — Lorne Forsythe; Brooks Kushman P.C.

(57) ABSTRACT

A system includes a computer having a processor and a memory storing instructions executable by the processor to: receive at least one discrete input within a predetermined time period from a human-machine interface while the vehicle is at a standstill; and in response to the at least one discrete input, move the vehicle an incremental distance and returning the vehicle to a standstill.

20 Claims, 6 Drawing Sheets

VEHICLE INCREMENTAL MOVEMENT SYSTEM

BACKGROUND

During certain vehicle maneuvers, a human driver may seek to stop movement of the vehicle, make a small movement, and return the vehicle to a stop. In order to perform such a maneuver, the human driver typically remove a foot from a brake pedal, taps the accelerator pedal, and again steps on the brake pedal while monitoring the position of the vehicle. One such example is a parallel parking maneuver in which the human driver uses the brake, acceleration, brake sequence in both forward vehicle movement and rearward vehicle movement to position the vehicle between two parked vehicles. Another example is during alignment of a hitch of the vehicle with a trailer in which the vehicle is typically moving rearward. Other examples may be during operation of the vehicle off-road including operations such as maneuvering on or around obstacles, e.g., ground obstacles like rocks, tree stumps, etc. In some examples, the human driver may also experience and account for creep torque during such maneuvers. When the vehicle experiences creep torque, the vehicle can drive at a slow speed when no pressure is applied to the accelerator pedal or to the brake pedal.

DETAILED DESCRIPTION

Figure 1A:
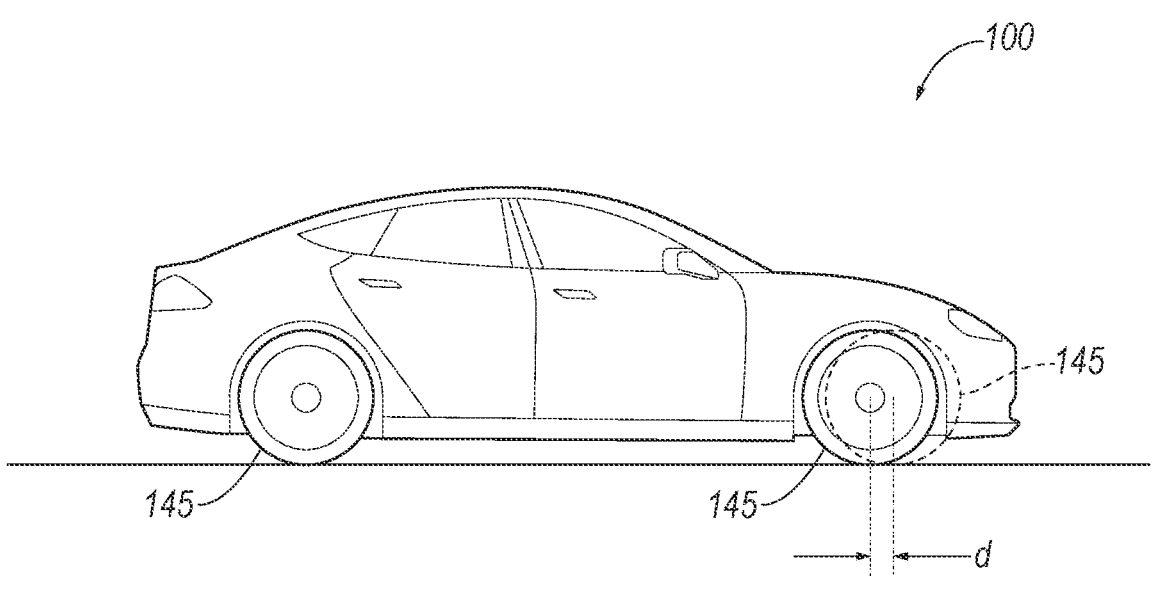
FIG. 1A is an example vehicle including an incremental-movement system, wherein the vehicle has moved an incremental distance by operation of the incremental-movement system.

This disclosure describes a system and method for controlling incremental movements of a vehicle under certain conditions when one or more discrete inputs are entered by a human driver of the vehicle in a time period. The conditions include that the vehicle is at a standstill vehicle when the one or more discrete inputs are entered by the human driver. When the conditions are met and the one or more discrete inputs are entered by the human driver, an incremental movement of the vehicle starts when the vehicle is at standstill and ends when the vehicle returns to a standstill. The discrete inputs are entered by the human driver through an incremental-movement user interface, e.g., a human-machine interface (HMI) such as a button, paddle, touchscreen, etc. In some examples, the incremental-movement user interface is on a steering wheel of the vehicle. The incremental-movement user interface is configured so that the discrete inputs are discrete from each other, i.e., individual and distinct from each other. In some examples, a single finger depression and finger release of the incremental-movement user interface (e.g., depressing and releasing a button with a finger, depressing and releasing a paddle with a finger, touching and untouching an icon on a touchscreen) corresponds to one discrete input. In examples in which more than one discrete input is entered through the incremental-movement user interface in a time period, the discrete inputs are individual and distinct from each other. For example, one finger depression and finger release is one discrete input and another finger depression and finger release in the time period is a second discrete input.

After entry of the one or more discrete inputs, e.g., at the end of the time period, the system moves the vehicle an incremental distance. The length of the incremental distance is based on the number of discrete inputs entered through the incremental-movement user interface in the time period. The length of the incremental distance is increased by additional discrete inputs entered through the incremental-movement user interface in the time period. In some examples, components of the vehicle are controlled by a closed-loop system to incrementally move the vehicle, and in other examples, components of the vehicle are controlled by an open-loop system to incrementally move the vehicle, as described further below.

Multiple, separate, incremental movements of the vehicle may be controlled by the human driver by discrete inputs in different time periods. In such instances, the incremental movements can be consecutively applied by the human driver and/or can be interspersed with control of the movement of the vehicle by other ways of controls a powertrain system of the vehicle, e.g. control with an accelerator pedal and/or brake pedal. As examples, the human driver may operate movement of the vehicle with multiple incremental movements, whether consecutive or interspersed with other movement control, to position the vehicle relative to stationary objects. For example, the human driver may operate the vehicle with one or more incremental movements to parallel park the vehicle. As another example, the human driver may operate the vehicle with one or more incremental movements to position a hitch of the vehicle relative to a trailer to be connected to the hitch. As another example, the human driver may operate the vehicle with one or more incremental movements to position a wheel of a vehicle next to or on top of a ground feature, e.g. a curb, a rock or stump during off-road use, etc. The human driver can steer the vehicle before and during the incremental movement of the vehicle to position the vehicle in the desired location relative to an exterior object. Operations, systems, and methods described herein should always be implemented and/or performed in accordance with an applicable owner's/user's manual and/or safety guidelines.

A system includes a computer having a processor and a memory storing instructions executable by the processor to: receive at least one discrete input within a predetermined time period from a human-machine interface while the vehicle is at a standstill; and in response to the at least one discrete input, move the vehicle an incremental distance and returning the vehicle to a standstill.

In some examples, the memory stores instructions executable by the processor to: receive an indication from a steering angle sensor that a steering angle of a steering wheel is outside of a predetermined range; and move the vehicle the incremental distance based on the indication that the steering angle is outside of the predetermined range. In such examples, the system may include the steering wheel of the vehicle and the steering angle sensor;

In some examples, the memory stores instructions executable by the processor to command a traction motor to move the vehicle in the incremental distance.

In some examples, the memory stores instructions executable by the processor to brake the wheel of the vehicle during movement of the vehicle in the incremental distance to return the vehicle to a standstill. For example, the system may include a wheel powered by the traction motor and a brake on the wheel; and the memory may store instructions executable by the processor to brake the wheel of the vehicle during movement of the vehicle in the incremental distance to return the vehicle to a standstill.

In some examples, the memory stores instructions executable by the processor to: receive more than one discrete input within the predetermined time period; and calculate the length of the incremental distance based on the number of discrete inputs. For example, the system may include a traction motor, and the memory may store instructions executable by the processor to: determine a motor input for at least one traction motor based on the length of the incremental distance; and command the at least one traction motor to rotate based on the motor input.

In some examples, the memory may store instructions executable by the processor to: receive more than one discrete input within the predetermined time period; and access a lookup table to identify a length of the incremental distance based on the number of discrete inputs.

In some examples, the memory may store instructions executable by the processor to: command a first traction motor to rotate a first wheel while measuring travel of a second wheel; then, identify occurrence of gear lash in the rotation of the second wheel; and then, command a second traction motor to rotate the second wheel while measuring travel of the first wheel. In such examples, the system may include the first traction motor, the second traction motor, the first wheel powered by the first traction motor, and the second wheel powered by the second traction motor.

In some examples, the memory may store instructions executable by the processor to: command the traction motor to initiate movement in the incremental step from standstill; measure travel of the wheel of the vehicle from standstill; and return the vehicle to standstill based on measurement of the travel of the wheel. In such examples, the system may include a traction motor and a wheel powered by the traction motor.

With reference to the Figures, wherein like numerals indicate like parts throughout the several views, a computer (hereinafter referred to as "vehicle computer 105") includes a processor and a memory, and the memory stores instructions executable by the processor to receive at least one discrete input within a predetermined time period from an incremental-movement user interface 115 while the vehicle 100 is at a standstill; and in response to the at least one discrete input, move the vehicle 100 an incremental distance (identified as "d" in FIGS. 1A-B) and returning the vehicle 100 to a standstill.

Figure 1B:
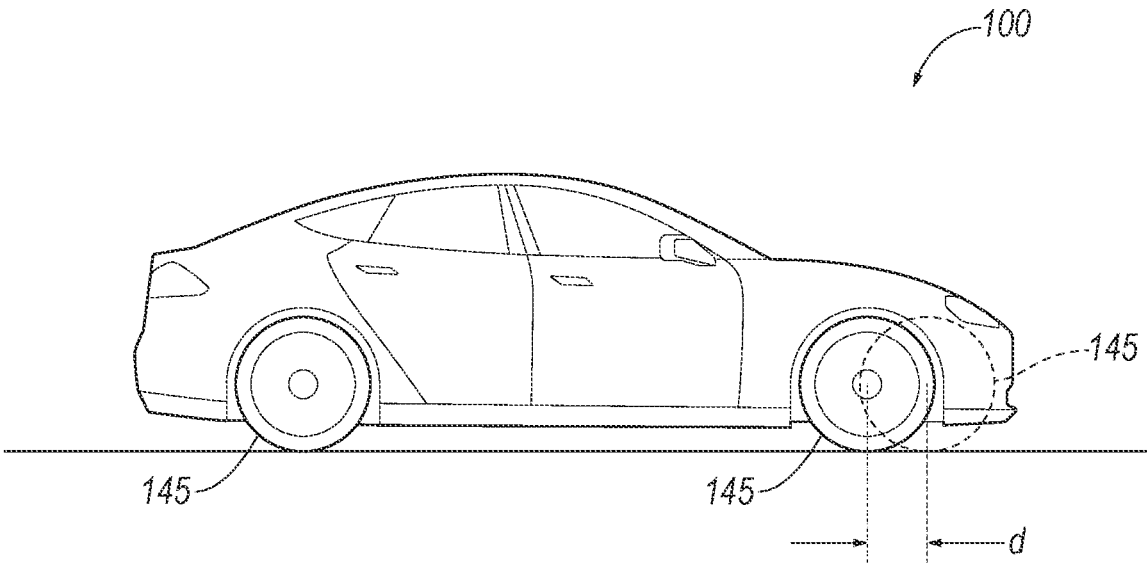
FIG. 1B is the example vehicle of FIG. 1A, wherein the vehicle has moved an incremental distance different than that in FIG. 1A by operation of the incremental-movement system.
Figure 2:
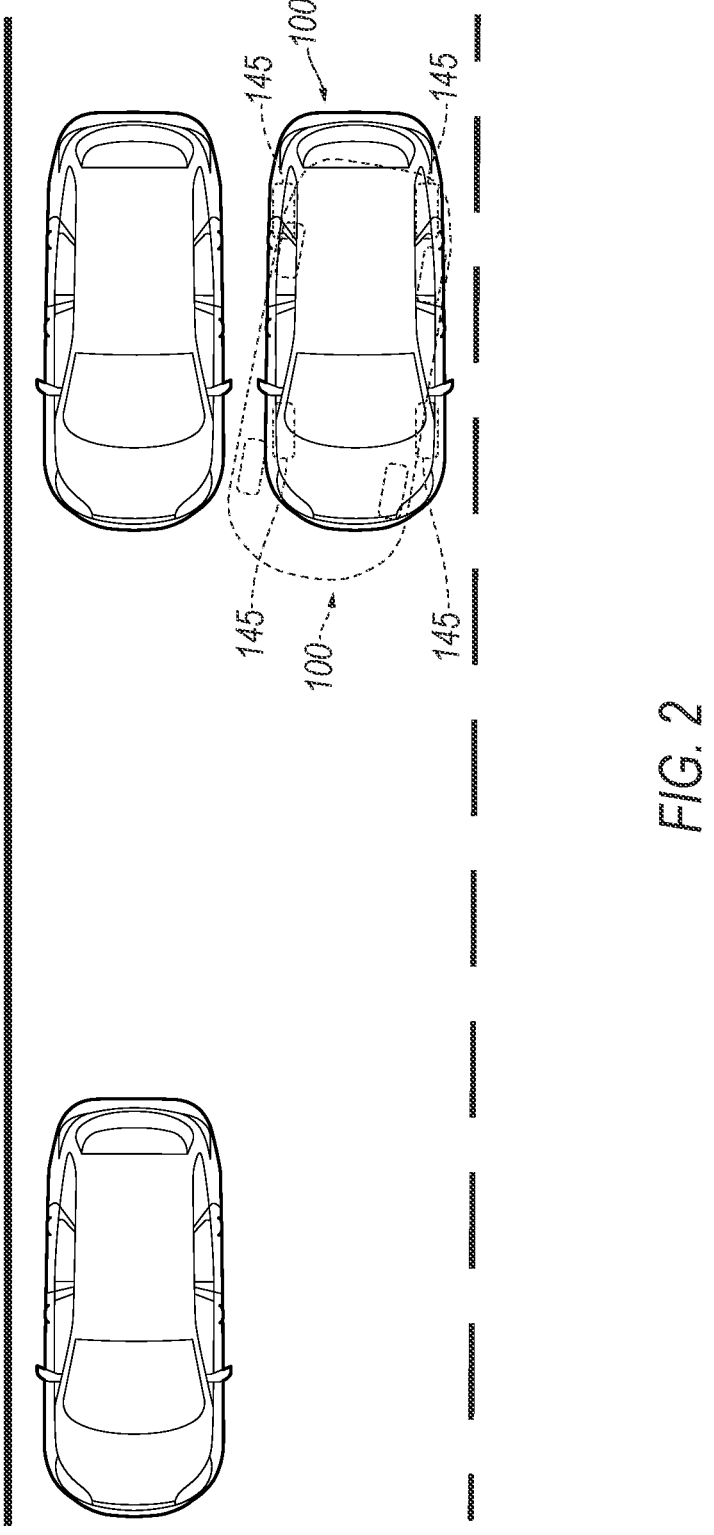
FIG. 2 is a plan view of a vehicle in the process of a parallel parking maneuver with the use of the incremental-movement system.

With reference to FIGS. 1A-2, the vehicle 100 may be any passenger or commercial automobile such as a car, a truck, a sport utility vehicle, a crossover, a van, a minivan, a taxi, a bus, etc.

Figure 3:
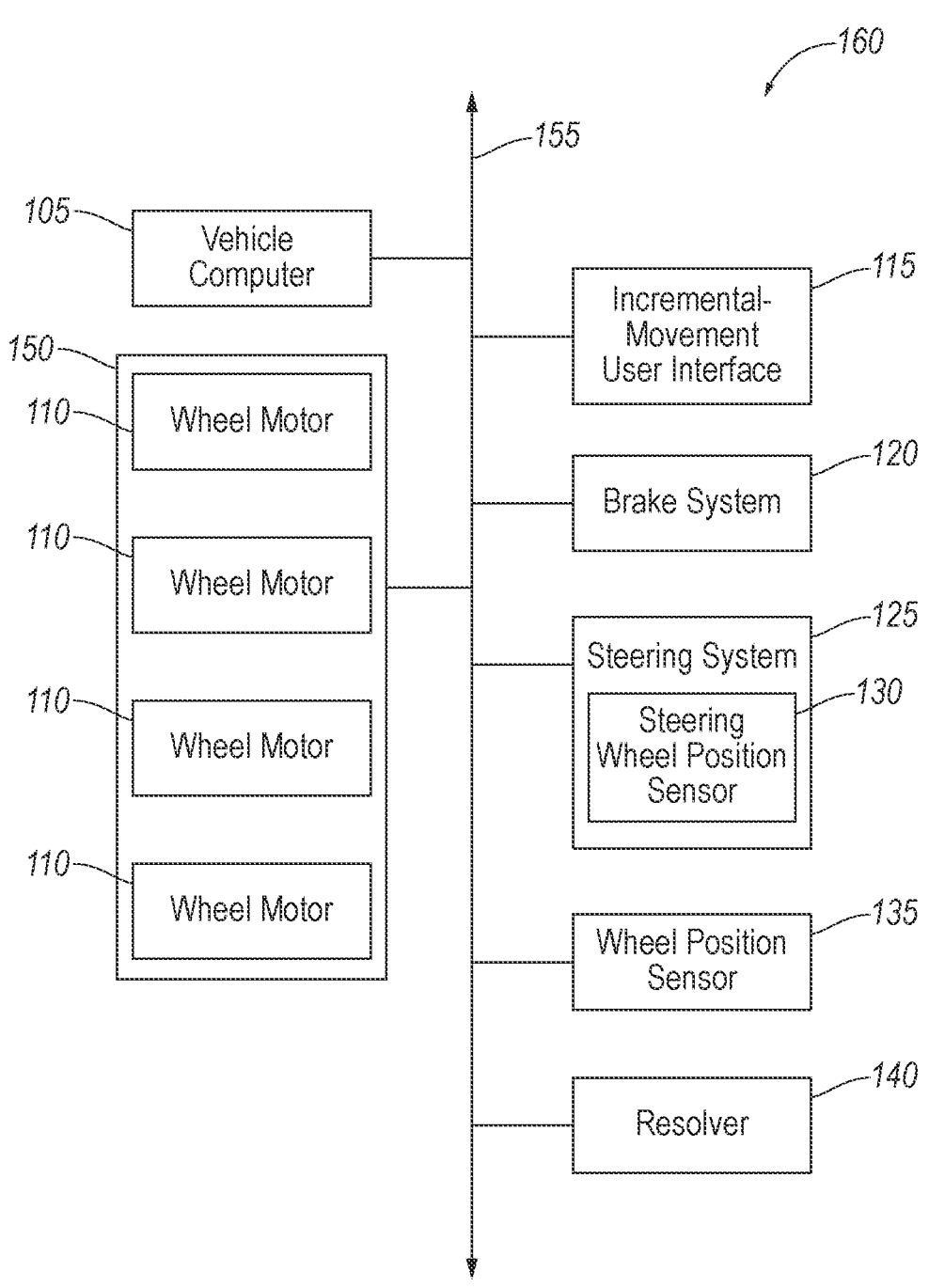
FIG. 3 is a schematic view of the incremental-movement system.

With reference to FIG. 3, a system (hereinafter the "incremental-movement system 160") includes the vehicle computer 105 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The vehicle computer 105 can thus include a processor, a memory, etc. The memory of the vehicle computer 105 can include media for storing instructions executable by the processor as well as for electronically storing data and/or databases, and/or the vehicle computer 105 can include structures such as the foregoing by which programming is provided. The vehicle computer 105 can be multiple computers coupled together.

The vehicle computer 105 may transmit and receive data through a communications network 155 such as a controller area network (CAN) bus, Ethernet, WiFi, Local Interconnect Network (LIN), onboard diagnostics connector (OBD-II), and/or by any other wired or wireless communications network. The vehicle computer 105 may be communicatively coupled to a propulsion system 150, a brake system 120, a steering system 125, sensors, an accelerator pedal, a brake pedal, the incremental-movement user interface 115, and other components via the communications network 155.

The propulsion system 150 of the vehicle 100 generates energy and translates the energy into motion of the vehicle 100. The propulsion system 150 may be a conventional vehicle propulsion system, for example, a conventional powertrain including an internal-combustion engine coupled to a transmission that transfers rotational motion to wheels 145; an electric powertrain including batteries and one or more electric motors, i.e., a traction motor 110, that transfer rotational motion to wheels 145 of the vehicle 100; a hybrid powertrain including elements of the conventional powertrain and the electric powertrain; or any other type of propulsion. The propulsion system 150 can include an electronic control unit (ECU) or the like, e.g., a powertrain control module, that is in communication with and receives input from the computer and/or a human driver. The human driver may control the propulsion system 150 via, e.g., the accelerator pedal and/or a gear-shift lever, as well as with the incremental-movement user interface 115 as described below.

In examples in which the propulsion system 150 is an electric powertrain or a hybrid powertrain, the propulsion system 150 may include a traction motor 110. In such an example, each traction motor 110 transfers rotational motion to the respective wheel 145 based on input from the communications network 155, e.g. from the powertrain control module. In some examples, the traction motors 110 may be a known type. For example, the traction motor 110 may be of a known type for propulsion of the vehicle 100 in an electric or hybrid vehicle. The traction motors 110 may be independently operable by the vehicle computer 105. In other words, each traction motors 110 can receive its own input from the vehicle computer 105 and the input from the vehicle computer 105 to the traction motors 110 may be different for any one or all of the traction motors 110. The wheel 145 transmits rotation from the traction motor 110 to the ground to propel the vehicle 100. The wheel 145 may include a rim and a tire, as is known.

In some examples, the traction motor 110 may drive an axle. In other examples, the traction motor 110 may be a wheel hub motor that drives an individual wheel 145. In some examples, the propulsion system 150 may include one, single traction motor 110, e.g., to drive a front axle or a rear axle. As another example, the propulsion system 150 may include two traction motors 110, e.g., one traction motor 110 to drive a front axle and one traction motor 110 to drive a rear axle. As another example, the propulsion system 150 may include three traction motors 110, e.g., one traction motor 110 driving a front axle and two traction motors 110 driving two rear wheels 145, respectively. As another example, the propulsion system 150 may include four traction motors 110, e.g., one traction motor 110 at each wheel 145, respectively.

As described herein, the propulsion system 150 can be controlled, in part, by operation of the incremental-movement user interface 115 under certain conditions. In addition to the incremental-movement user interface 115, the propulsion system 150 may include an accelerator pedal to control the operation of the propulsion system 150. The accelerator pedal provides input to the computer indicating a position of the accelerator pedal for use in controlling the propulsion system 150 and/or the brake system 120. The accelerator pedal is positioned to be pressable by an operator of the vehicle 100. The accelerator pedal is movable relative to the body of the vehicle 100, e.g., is coupled by a hinge to the body of the vehicle 100. The accelerator has a range of motion, e.g., an angular range of motion around the hinge. The position of the accelerator pedal within the range of motion is communicated to the vehicle computer 105. In some examples, the accelerator pedal is at a floor of the vehicle 100 for control by a foot of a human driver. In other examples, the accelerator pedal may be in other locations in the interior of the vehicle 100, e.g., a paddle on the steering wheel 145.

The brake system 120 is typically a conventional vehicle braking subsystem and resists the motion of the vehicle 100 to slow and/or stop the vehicle 100. The braking system slows or stops rotation of the wheels 145 relative to the ground. In some examples, the brake system 120 may engage components of the wheels 145 to stop the wheels 145, e.g., may include friction brakes such as disc brakes, drum brakes, band brakes, etc. In addition or in the alternative, in some examples, the traction motor 110 may brake the respective wheel 145. In such an example, component of the traction motor 110 slows or stops rotation of the respective wheel 145 relative to the ground. In some examples, the brakes may be regenerative brakes. The brakes may be of any suitable type of brakes, including, in some examples, those that are known.

The brake system 120 can include an electronic control unit (ECU) or the like, e.g., a brake control module, that is in communication with and receives input from the vehicle computer 105 and/or a human driver. The human driver may control the brake system 120 via, e.g., the brake pedal.

The brake system 120 may include brake pedal that provides input to the vehicle computer 105 indicating a position of the brake pedal for use in controlling the brake system 120. The brake pedal is positioned to be pressable by an operator of the vehicle 100. The brake pedal is movable relative to the body of the vehicle 100, e.g., is coupled by a hinge to the body of the vehicle 100. The brake has a range of motion, e.g., an angular range of motion around the hinge. The position of the brake pedal within the range of motion is reported to the computer. In some examples, the brake pedal is at a floor of the vehicle 100 for control by a foot of a human driver. In other examples, the brake pedal may be in other locations in the interior of the vehicle 100, e.g., a paddle on the steering wheel 145.

The steering system 125 controls the turning of the wheels 145 to steer the direction of travel of the vehicle 100. The steering system 125 may be a rack-and-pinion system with electric power-assisted steering, a steer-by-wire system, as both are known, or any other suitable system. The steering system 125 can include an electronic control unit (ECU) or the like, e.g., a steering control module, that is in communication with and receives input from the computer and/or a human driver. The human driver may control the steering system 125 via, for example, a steering wheel 145.

In some examples, the steering system 125 includes a steering-wheel position sensor 130. The steering-wheel position sensor 130 measures the rotational position of the steering wheel 145 relative to the body of the vehicle 100. Specifically, the steering-wheel position sensor 130 measures the position of the steering wheel 145 that steers travel of the vehicle 100. As an example, the steering-wheel position sensor 130 may be a rotational sensor that senses the rotational position of the steering wheel 145, e.g., by measurement of the steering wheel 145 or a steering shaft connected to the steering wheel 145.

Measurements from the steering-wheel position sensor 130 may be used to identify whether the rotational position of the steering wheel 145 is within our outside of a predetermined range. As an example, an example coordinate system may label the centered position of the steering wheel 145 (i.e., the position of the steering wheel 145 when steering the vehicle 100 in a straight line) as 0 degrees. As one example, the predetermined range may be +/−30 degrees from center. The vehicle computer 105 may receive communication of the angular position of the steering wheel 145 from the steering-wheel position sensor 130 and may determine whether the angular position is within the predetermined range (e.g., less than +/−30 degrees from center) or outside of the predetermined range (e.g., greater than +/−30 degrees from center).

In some examples, the vehicle 100, e.g., the propulsion system 150, may include a wheel-position sensor 135 for each wheel 145. The wheel-position sensor 135 senses the rotational position of the wheel 145, e.g., relative to a body of the vehicle 100. The wheel-position sensor 135 may be, for example, a rotary encoder. In some examples, the rotary encoder may be a component of an anti-lock brake system. The vehicle 100 may include a wheel-position sensor 135 at each wheel 145.

In some examples, the vehicle 100 may include a resolver 140 at each wheel 145. The resolver 140 measures the rotational position of the wheel 145, e.g., relative to a body of the vehicle 100. The resolver 140 may measure the rotational position in degrees of rotation. The resolver 140 may be an analog device or a digital device. In some examples, the resolver 140 may be a component of the traction motor 110.

The vehicle 100 may be operable in one-pedal drive mode. When the one-pedal drive mode is disengaged (or when a vehicle 100 is not equipped with one-pedal drive), the vehicle 100 can drive at a slow speed when no pressure is applied to the accelerator pedal or to the brake pedal. This is called creep torque. When in one-pedal drive mode, the vehicle 100 will accelerate when pressure is applied to the accelerator pedal, and the vehicle 100 will brake when no pressure is applied to the accelerator pedal, even if no pressure is applied to the brake pedal. In other words, the vehicle 100 does not use creep torque when one-pedal drive mode is engaged.

The vehicle 100 may be operable in an automatic vehicle hold mode. In response to the automatic vehicle hold being active, the computer brakes the vehicle 100 in response to a brake pedal of the vehicle 100 being released while the vehicle 100 is at a standstill. In other words, when the vehicle 100 is at a standstill, the vehicle 100 remains at a standstill until the computer receives an input to accelerate. Thus, the vehicle 100 does not exhibit creep torque when stopped.

The vehicle 100 may be operable in a low-speed mode. When the vehicle 100 is in the low-speed mode, the vehicle computer 105 is programmed to control acceleration and braking of the vehicle 100 based on input from the components of the propulsion system 150 and/or the braking system of the vehicle 100 according to the low-speed mode. In the low-speed mode, acceleration occurs upon receiving input from the human driver. The vehicle computer 105 actuates the propulsion system 150 to accelerate the vehicle 100 upon receiving input from the human driver, e.g., through the acceleration pedal. The acceleration may be capped at a maximum torque or maximum speed. The maximum torque or maximum speed may be chosen to keep the vehicle 100 within speeds appropriate for parking, trailering, or similar maneuvers. In the low-speed mode, braking occurs upon not receiving input from the accelerator pedal or from any of the alternative input devices. In other words, the vehicle computer 105 actuates the brake system 120 to slow or stop the vehicle 100 upon not receiving input from any of the input devices that are designated to provide input controlling acceleration, even if the brake pedal is not being pressed. The braking force applied by the brake system 120 may depend on circumstances such as how the low-speed mode was engaged. For example, the braking force may be applied by regenerative brakes of the brake system 120 and may slow the vehicle 100 more gradually (sometimes called one-pedal drive), or the braking force may be applied by the disc brakes of the brake system 120 at a typical braking force used when the brake pedal is engaged. In the low-speed mode, braking also occurs upon receiving an input from the brake pedal, in the same manner as occurs in a two-pedal-drive mode.

The vehicle computer 105 is programmed to, in response to the low-speed mode being inactive, control acceleration and braking of the vehicle 100 not according to the low-speed mode. For example, the vehicle 100 may be in the two-pedal-drive mode. In the two-pedal-drive mode, acceleration occurs upon receiving input from the accelerator pedal, and braking occurs upon receiving input from the brake pedal. If neither the accelerator pedal nor the brake pedal is providing input (i.e., are pressed by the operator), then friction will slow the vehicle 100, and the vehicle 100 will exhibit creep torque at low speeds.

The vehicle computer 105 is programmed to switch the vehicle 100 between various modes, e.g., one-pedal drive mode, two-pedal drive mode, low-speed mode, and automatic vehicle hold mode, under various conditions. The method 400 is operable in any suitable vehicle mode as long as the vehicle 100 is at a standstill. The vehicle 100 being at a standstill is a condition for operation of method 400. The vehicle 100 is at a standstill when all wheels 145 of the vehicle 100, i.e., all four wheels 145 in four-wheeled vehicle examples, are stationary relative to the body of the vehicle 100 and the ground.

The incremental-movement user interface 115 is a human-machine interface (HMI) designed to receive discrete inputs from the human driver. The incremental-movement user interface 115 may be, for example, a button, paddle, touchscreen, etc., designed receiving input from the human driver. The incremental-movement user interface 115 may be in the interior of the vehicle 100. In other words, in such examples, the incremental-movement user interface 115 is in the passenger cabin. In such examples, the incremental-movement user interface 115 is accessible by the human driver of the vehicle 100 to operate the incremental-movement user interface 115 during operation of the vehicle 100. In such examples, the incremental-movement user interface 115 is positioned in the passenger cabin so that the incremental-movement user interface 115 can be reached by the human operator of the vehicle 100 while the human operator remains seated and controlling the steering wheel 145. In some examples, the incremental-movement user interface 115 is on the steering wheel 145 of the vehicle 100. In other examples, the incremental-movement user interface 115 may be on an exterior of the vehicle.

The incremental-movement user interface 115 is configured so that the discrete inputs are discrete from each other, i.e., individual and distinct from each other. The incremental-movement user interface 115 has a binary operation, i.e., the incremental-movement user interface 115 has two positions, activated by the human driver or not activated by the human driver. In some examples, a single finger depression and finger release of the incremental-movement user interface 115 (e.g., depressing and releasing a button with a finger, depressing and releasing a paddle with a finger, touching and untouching an icon on a touchscreen) corresponds to one discrete input. In examples in which more than one discrete input is entered through the incremental-movement user interface 115 in a time period, the discrete inputs are individual and distinct from each other. For example, one finger depression and subsequent finger release is one discrete input and another finger depression and finger release in the time period is a second discrete input.

Figure 4:
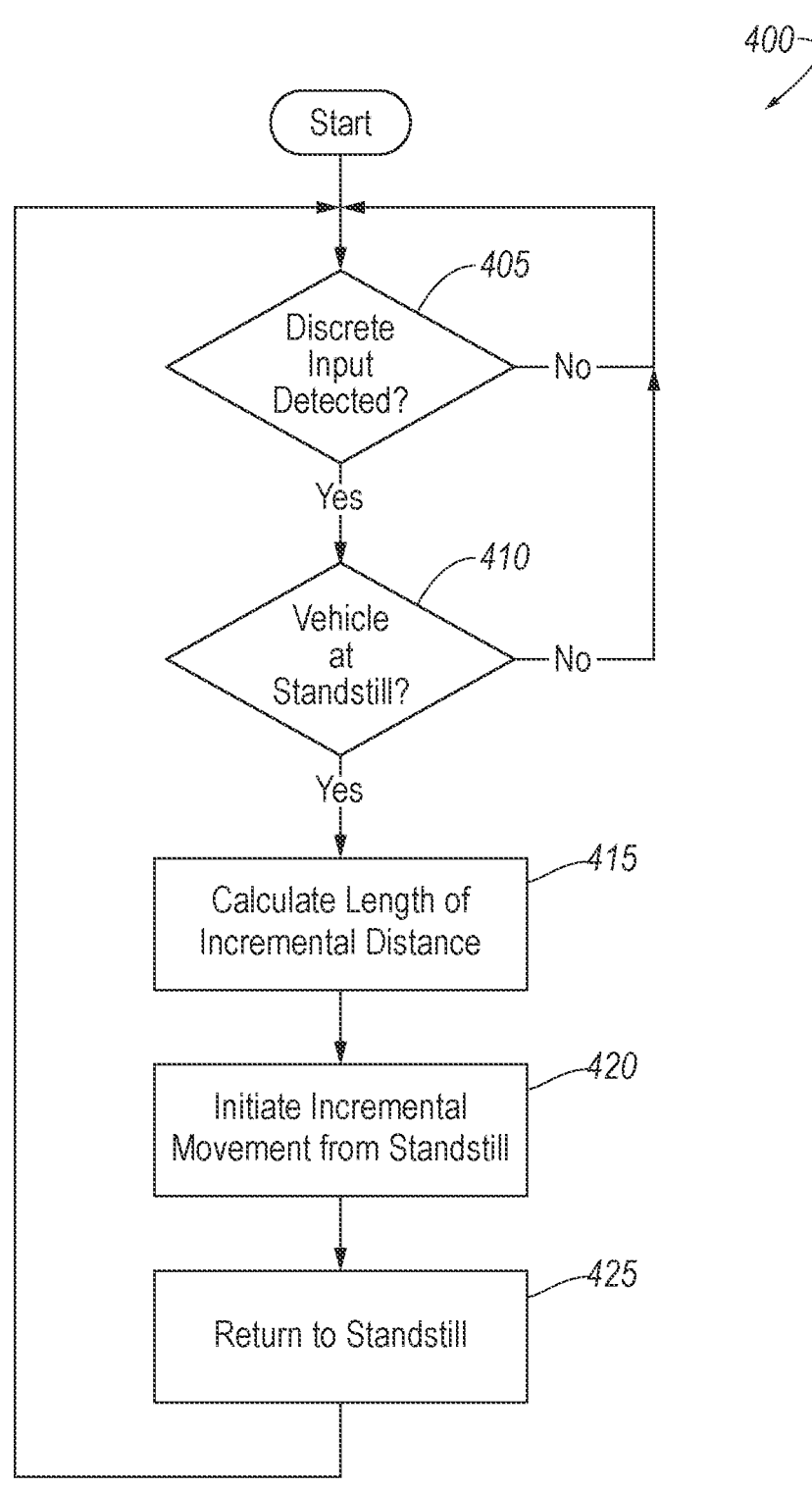
FIG. 4 is an example method performed by the incremental-movement system.

The operation of the incremental-movement user interface 115 under certain conditions, e.g., operation according to method 400 in FIG. 4, moves the vehicle 100 an incremental distance. The incremental distance is a relatively small distance that initiates when the vehicle 100 is at a standstill and ends when the vehicle 100 is at a standstill. As set forth above, the vehicle 100 is at a standstill when all wheels 145 of the vehicle 100, i.e., all four wheels 145 in four-wheeled vehicle examples, are stationary relative to the body of the vehicle 100 and the ground. The incremental distance, as an example, may be between 0.5 inches and 1.5 inches (12.7 mm-38.1 mm) depending on the number of discrete inputs to the incremental-movement user interface 115 in the time period. Examples of the incremental distance traveled by the vehicle 100 by operation of the incremental-movement system 160 are shown in FIGS. 1A and 1B. The incremental distance in FIGS. 1A and 1B is identified with reference "d." The magnitude of the incremental distance in FIGS. 1A and 1B are shown by way of example and, in some examples, may be exaggerated for illustrative purposes. An incremental distance traveled by the vehicle by operation is also shown, but not identified with "d", by operation of the incremental-movement system 160 in FIG. 3.

The input from the incremental-movement user interface 115 may map onto a torque outputted by the propulsion system 150 over time, i.e., $t=f(I)$, in which t is the torque outputted by the propulsion system 150 and/is the input. In such an example, the systems of the vehicle 100 operate to provide torque to one or more traction motors 110 over a time to target movement of the vehicle 100 in the incremental distance. For example, the torque outputted by the propulsion system 150 targets movement of the vehicle 100 in the incremental distance based on input to the incremental-movement user interface 115 during the time period.

The input from the incremental-movement user interface 115 may map onto a distance traveled by the vehicle 100 before stopping, i.e., $d=f(I)$, in which d is the distance traveled by the vehicle 100 and/is the input. In such an example, the systems of the vehicle 100 operate rotate at least one of the traction motors 110 to a rotational position to the target movement of the vehicle 100 in the incremental distance, i.e., d is the incremental distance. For example, the vehicle computer 105 may control acceleration and braking of the vehicle 100 to travel the incremental distance and then stop movement of the vehicle 100. To travel the incremental distance, the vehicle computer 105 may actuate the propulsion system 150 until the vehicle 100 has traveled the incremental distance and actuate the brake system 120 to brake the vehicle 100 to a stop upon the vehicle 100 traveling the incremental distance.

The input from the incremental-movement user interface 115 may map onto a speed at which the vehicle 100 travels, i.e., $v=f(I)$, in which v is the vehicle velocity and/is the input. In such an example, the systems of the vehicle 100 operate rotate at least one of the traction motors 110 at a velocity to the target movement of the vehicle 100 in the incremental distance. For example, the vehicle computer 105 may control acceleration and braking of the vehicle 100 to reach a velocity to travel the incremental distance and then stop movement of the vehicle 100.

The human driver may use the incremental-movement user interface 115 when the vehicle 100 is at a standstill to selectively move the vehicle 100 incremental distances. As set forth above, the incremental distances are relatively small. As examples, the human drive may bring the vehicle 100 to a standstill and selectively use the movement in incremental distances in situations such as to parallel park the vehicle 100 (e.g., see FIG. 2), to align a hitch of the vehicle 100 with a trailer to be towed, to driver around or on top of a ground feature such as a rock or stump during off-road use, or any other instance in which incremental movement from a standstill is useful to the human driver. When the human driver brings the vehicle 100 to a standstill, the human driver can identify a desired position of the vehicle 100 and provide discrete inputs to the incremental-movement user interface 115 to incrementally move the vehicle 100 to the desired position. If a longer incremental distance is desired, the vehicle driver may provide multiple discrete inputs to the incremental-movement user interface 115 in a time period to increase the next incremental distance under the conditions described herein. Movement of the vehicle 100 in multiple, separate, incremental distances may be controlled by the human driver by discrete inputs in different time periods. In such instances, the incremental movements can be consecutively applied by the human driver and/or can be interspersed with control of the movement of the vehicle 100 by other ways of controlling the propulsion system 150 of the vehicle 100, e.g. control with an accelerator pedal and/or brake pedal. In the event the incremental movements are interspersed with use other controls of the propulsion system 150, e.g. the accelerator pedal and/or brake pedal, the vehicle 100 is brought to a standstill before the next incremental movement can be made with the use of the incremental-movement user interface 115. The incremental movement of the vehicle 100 may be forward movement of the vehicle 100 or rearward movement of the vehicle 100, depending on the gear selection of the vehicle 100. In other words, the incremental distance may be a distance in a vehicle-forward direction or a distance in a vehicle-rearward direction based other operating conditions of the vehicle 100.

As set forth above, the vehicle driver may provide multiple discrete inputs to the incremental-movement user interface 115 in a time period to increase the next length of the incremental distance under the conditions described herein. The time period is a relatively short period, e.g., three seconds. As an example, if conditions are met, including that the vehicle 100 is at a standstill, a discrete input to the incremental-movement user interface 115 initiates the operation of the incremental-movement system 160, e.g., operation of method 400. The time period begins upon one discrete input to the incremental-movement user interface 115. For example, the vehicle computer 105 may receive the first discrete input that initiated the operation of the incremental-movement system 160 and may wait for the time period to detect any additional discrete inputs. After the expiration of the time period, the vehicle computer 105 calculates the length of the incremental distance based on the number of discrete inputs entered, i.e., the discrete input to initiate the time period and any additional discrete inputs that may have been entered during the time period. Thereafter, the operation of method 400 continues. The time period may be a constant, i.e., the same length of time each time the incremental-movement system 160 is operated. In such an example, the time period is predetermined and programmed into the vehicle computer 105 as a constant.

The incremental-movement system 160 may limit the number of discrete inputs in any one time period. In some examples, the number of discrete inputs may be limited to a total of three discrete inputs to initiate the time period and entered during the time period. In the event more the number of discrete inputs during one time period exceeds the limit, the vehicle computer 105 ignores the discrete inputs above the limit. After completion of the movement in the incremental distance and return of the vehicle 100 to standstill, a new batch of one or more discrete inputs may be entered if all other conditions are met to again perform method 400 for another incremental movement.

The vehicle computer 105 is programmed to operate the other components of the incremental-movement system 160 as described herein. Specifically, the vehicle computer 105 is programmed to perform the method 400 shown in FIG. 4 and as described herein. Use of "in response to," "based on," and "upon determining" herein indicates a causal relationship, not merely a temporal relationship.

With reference to FIG. 4, the method 400 includes receiving at least one discrete input from the incremental-movement user interface 115. Upon entry of one discrete input by the human driver, e.g., depressing or touching the incremental-movement user interface 115 as described above, the method 400 is initiated. As described above, the time period is initiated at the entry of the first discrete input by the human driver for the current request for operation of the incremental-movement system 160.

As shown in block 410, the vehicle 100 being at a standstill is a condition for operation of the method 400. If the vehicle 100 is not at a standstill when the first discrete input is detected, the current request for operation of the incremental-movement system 160 is aborted and the method 400 returns to block 405 to restart the method 400. An indicator, e.g., a visual or audible indicator, may be provided to the human driver indicating that the requested operation of the incremental-movement system 160 was not carried out because the vehicle 100 was not at a standstill.

In some examples, a condition to initiate the operation of method 400 includes that a brake is not manually applied by the human driver to the vehicle 100, e.g., a brake pedal is not depressed by the human driver in examples including a brake pedal. In some examples, a condition to initiate the operation of the method 400 includes detection that a steering angle of the steering wheel 145 is outside of a predetermined range, e.g., based on a measurement by the steering-wheel position sensor 130. Such an example may be used in operation of the method 400 for parallel parking in which the initial angle of the steering wheel 145 must be turned relatively sharply (e.g., see FIG. 2). In such examples, the predetermined range may be, for example, +/−30 degrees from center, i.e., the condition is satisfied when the steering wheel 145 is turned more than +30 degrees from center or more than −30 degrees from center. In such examples, the method 400 includes determining that a steering angle of a steering wheel 145 of the vehicle 100 is outside of a predetermined range and then moving the vehicle 100 the incremental distance based on the determination that the steering angle is outside of the predetermined range in addition to the other conditions described herein.

With reference to block 415, the method 400 includes calculating the length of the incremental distance that will be targeted for vehicle movement. As set forth above, the entry of the first discrete input by the human driver in the current request for operation of the incremental-movement system 160 initiates the time period. Additional discrete inputs by the human driver during the time period increase the length of the incremental distance that will be targeted for vehicle movement. In other words, the human driver can select an increase in the incremental distance by entering multiple discrete inputs to the incremental-movement user interface 115. As set forth above, the number of discrete inputs that can be entered during the time period may be limited.

In response to the at least one discrete input during the time period, the method 400 includes moving the vehicle 100 an incremental distance, as shown in block 420. After the length of the incremental distance is calculated, the method includes commanding a traction motor 110 to move the vehicle 100 in the incremental distance. The number of discrete inputs during the time period and the corresponding length of the incremental distance is used in determining a motor input for at least one traction motor 110. Block 420 includes commanding at least one traction motor 110 to rotate based on that motor input.

The calculation of the length of the incremental distance based on additional discrete inputs during the time period and the associated movement of the vehicle 100 may be made in any suitable way. Several examples are described herein merely by way of example. In any of the examples, the propulsion system 150 and the braking system may be used interactively to target movement of the vehicle 100 in the incremental distance.

Figure 5A:
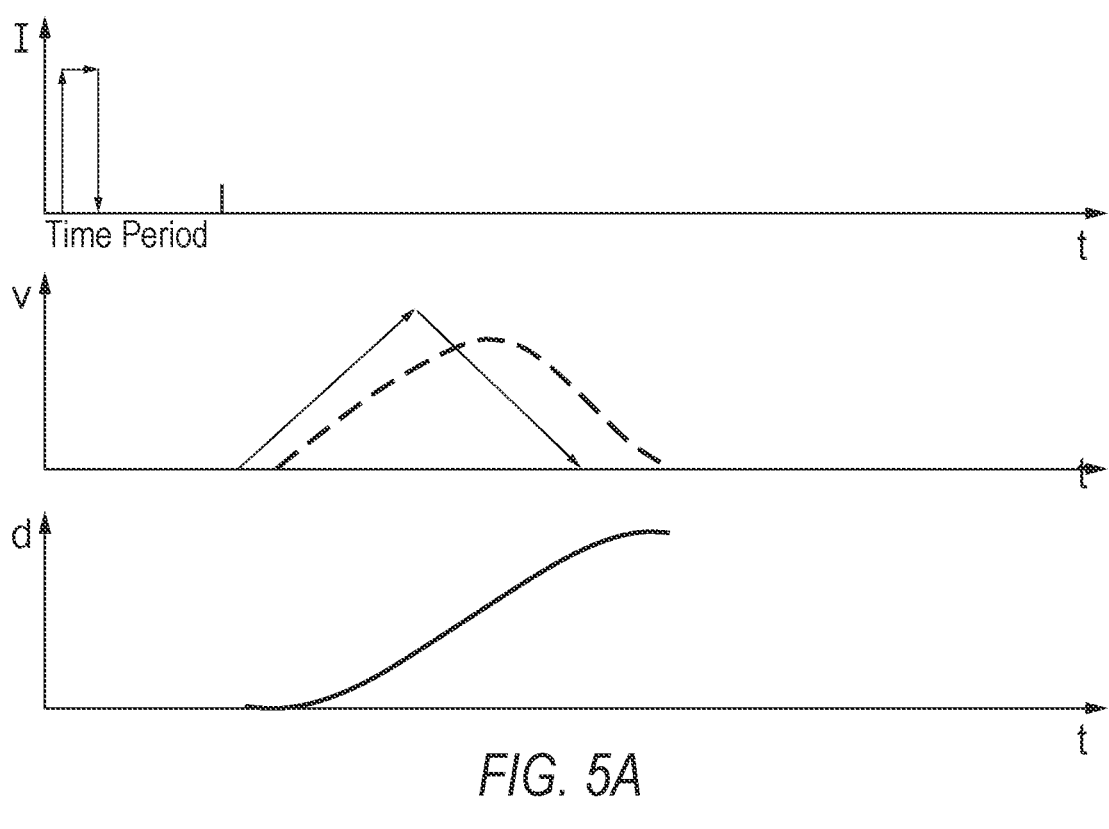
FIG. 5A includes example graphs of one example of the incremental-movement system showing entry of one discrete input to the incremental-movement system, the corresponding velocity of the vehicle under operation of the incremental-movement system, and distance traveled by the vehicle under operation of the incremental-movement system.
Figure 5B:
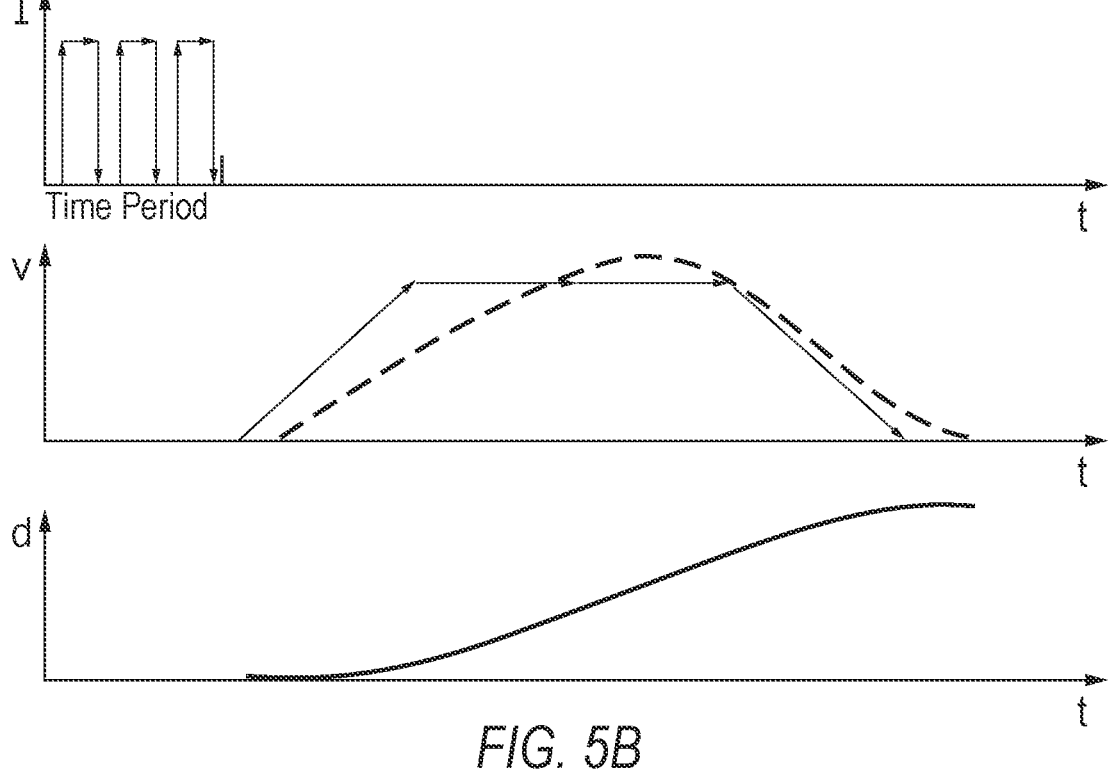
FIG. 5B includes example graphs of the example incremental-movement system of FIG. 5A showing entry of three discrete inputs to the incremental-movement system in a time period, the corresponding velocity of the vehicle under operation of the incremental-movement system, and distance traveled by the vehicle under operation of the incremental-movement system.

As one example of the calculation of the length of the incremental distance and associated movement of the vehicle 100, the method 400 may include accessing a lookup table to identify a length of the incremental distance based on the number of discrete inputs. Such an example is an open-loop system. As one example, the lookup table may include vehicle velocity over time. One such example is shown in FIGS. 5A and 5B. In FIG. 5A, the top graph shows a single discrete input during the time period. In the middle graph of FIG. 5A, the solid line depicts the ramp up and ramp down of vehicle velocity over time based on the lookup table to target movement in the incremental distance. In the middle graph of FIG. 5A, the dotted lines shows a hypothetical example of the actual velocity of the vehicle 100 under the operation of the method 400. The bottom graph of FIG. 5A shows a hypothetical example of the distance traveled by the vehicle 100 under the application of the velocity in the middle graph of FIG. 5A. In FIG. 5B, the top graph shows the entry of three discrete inputs during the time period. In the middle graph of FIG. 5B, the solid line depicts the ramp up, maintenance, and ramp down of vehicle velocity over time based on the lookup table to target movement in the incremental distance. In the middle graph of FIG. 5B, the dotted lines shows a hypothetical example of the actual velocity of the vehicle 100 under the operation of the method 400. The bottom graph of FIG. 5B shows a hypothetical example of the distance traveled by the vehicle 100 under the application of the velocity in the middle graph of FIG. 5B. The peak velocity in the middle graphs of FIGS. 5A and 5B are the same and may be, as an example, 0.1 kph. As another example, the lookup table may include, for example, a torque profile for each number of discrete inputs during the time period. The torque profile includes the variation in torque over time. The torque is applied by the traction motor 110 to the wheel 145 according to the torque profile. The distance traveled is not actively measured and assumed to be achieved with a certain vehicle velocity or torque profile over time.

Figure 6:
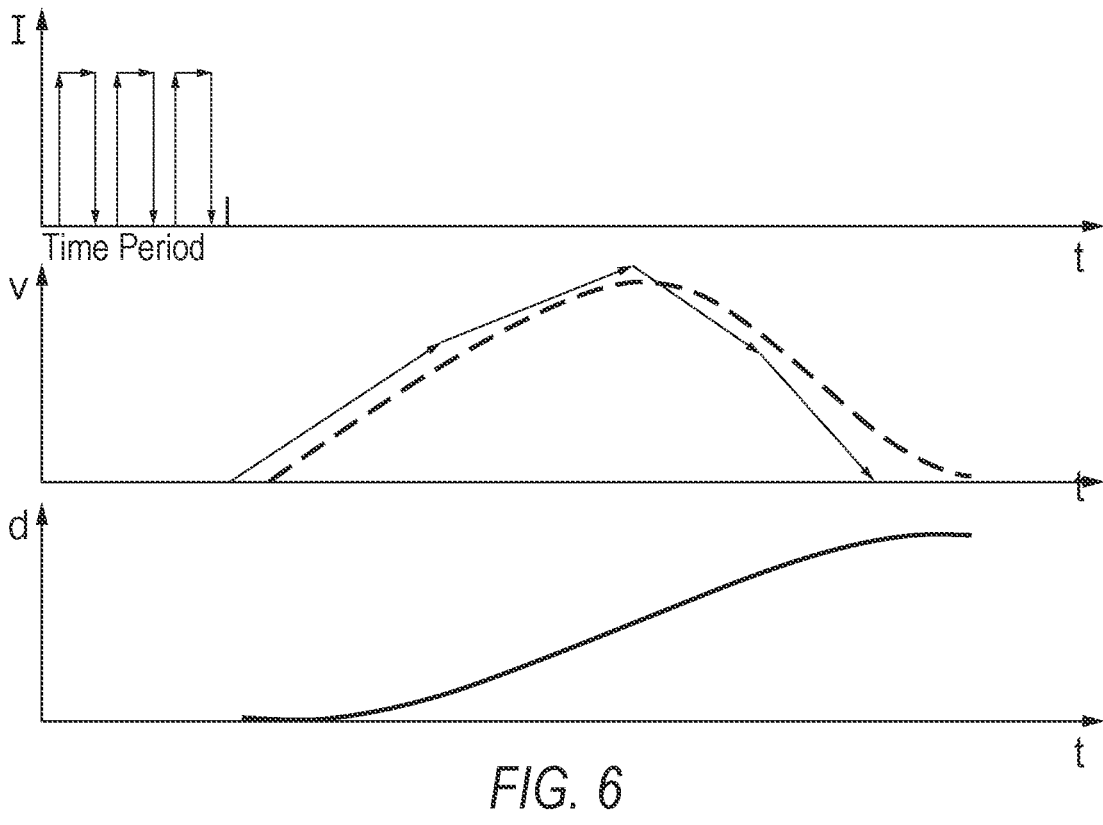
FIG. 6 includes example graphs of another example of the incremental-movement system showing entry of three discrete inputs to the incremental-movement system in a time period, the corresponding velocity of the vehicle under operation of the incremental-movement system, and distance traveled by the vehicle under operation of the incremental-movement system.

As another example of the calculation of the length of the incremental distance and associated movement of the vehicle 100, the method 400 may be an closed loop system that receives measurement of the distance traveled and returns the vehicle 100 to a standstill at incremental distance. For example, the method 400 includes commanding at least one of the traction motors 110 to initiate movement of the vehicle 100 in the incremental step from standstill, measuring travel of the wheel 145 powered by the traction motor 110 from standstill, and returning the vehicle 100 to standstill based on measurement of the travel of the wheel 145. The measurement of the distance traveled by the vehicle 100 may be, for example, taken by the wheel position sensor 135 and/or the resolver 140, as described above. An example is shown in FIG. 6 in which the top graph, as an example, shows three discrete inputs during the time period. In the middle graph of FIG. 6, the solid line depicts the ramp up and ramp down of vehicle velocity over time based on the measured travel distance to target movement in the incremental distance. In the middle graph of FIG. 6, the dotted lines shows a hypothetical example of the actual velocity of the vehicle 100 under the operation of the method 400. The bottom graph of FIG. 6 shows a hypothetical example of the distance traveled by the vehicle 100 under the application of the velocity in the middle graph of FIG. 6. In such examples, the peak velocity (e.g., the peak velocity in the middle graph of FIG. 6) may be constant for each operation of the method 400 regardless of the number of discrete inputs. As an example, the peak velocity may be 0.1 kph.

As another example of the calculation of the length of the incremental distance and associated movement of the vehicle 100, the method 400 may include steps to reduce or remove gear lash as a variable to the distance traveled by the vehicle 100. Gear lash, as is known, is the play, or slop, between two gears that can allow relative movement between two gears at initial rotation. In the example shown in FIG. 7, the method includes staggering power between two traction motors 110 to reduce or eliminate gear lash from target movement of the vehicle 100 along the incremental distance. Specifically, the method 400 may include commanding a first traction motor 110 to rotate a first wheel 145 of the vehicle 100 while measuring traveled distance of a second wheel 145 of the vehicle 100. In such an example, the first wheel 145 may be one of a front wheel 145 or a rear wheel 145 and the second wheel 145 is the other of the front wheel 145 or a rear wheel 145. In such an example, the propulsion system 110 includes at least two traction motors 110, i.e., one for the first wheel 145 and one for the second wheel 145. For example, the propulsion system 110 in such examples may include one traction motor 110 that drives one or both rear wheels 145 and another traction motor 110 that drives one or both of the front wheels 145. As the first traction motor 110 moves the vehicle 100, any gear lash in the gearing to the second wheel 145 is avoided, i.e., the play between gears is avoided as second wheel 145 is rotated by movement of the vehicle 100 as powered by the first traction motor 110. After powering the first traction motor 110, the method 400 then includes identifying occurrence of gear lash in the rotation of the first wheel 145 (since it is driving the vehicle). As an example, a lash crossing can be detected with the measurement of the movement of the first traction motor 110. The lash crossing may be, for example, a detected spike in the measured motor speed. After identifying the occurrence of gear lash in the rotation of the first wheel 145, the method then includes commanding a second traction motor 110 that powers the second wheel 145 to rotate the second wheel 145 while measuring the traveled distance of the first wheel 145. The measurement of the traveled distance of the second wheel 145 and the subsequent measurement of traveled distance of the first wheel 145 can be used, in combination, to measure the traveled distance of the vehicle 100. The elimination of gear lash increases the accuracy of the measurement of the traveled distance. The measurement of the traveled distance of the first wheel 145 and the second wheel 145 described in this example may be taken by, for example, the wheel position sensor 135 and/or the resolver 140 of that wheel 145.

Figure 7:
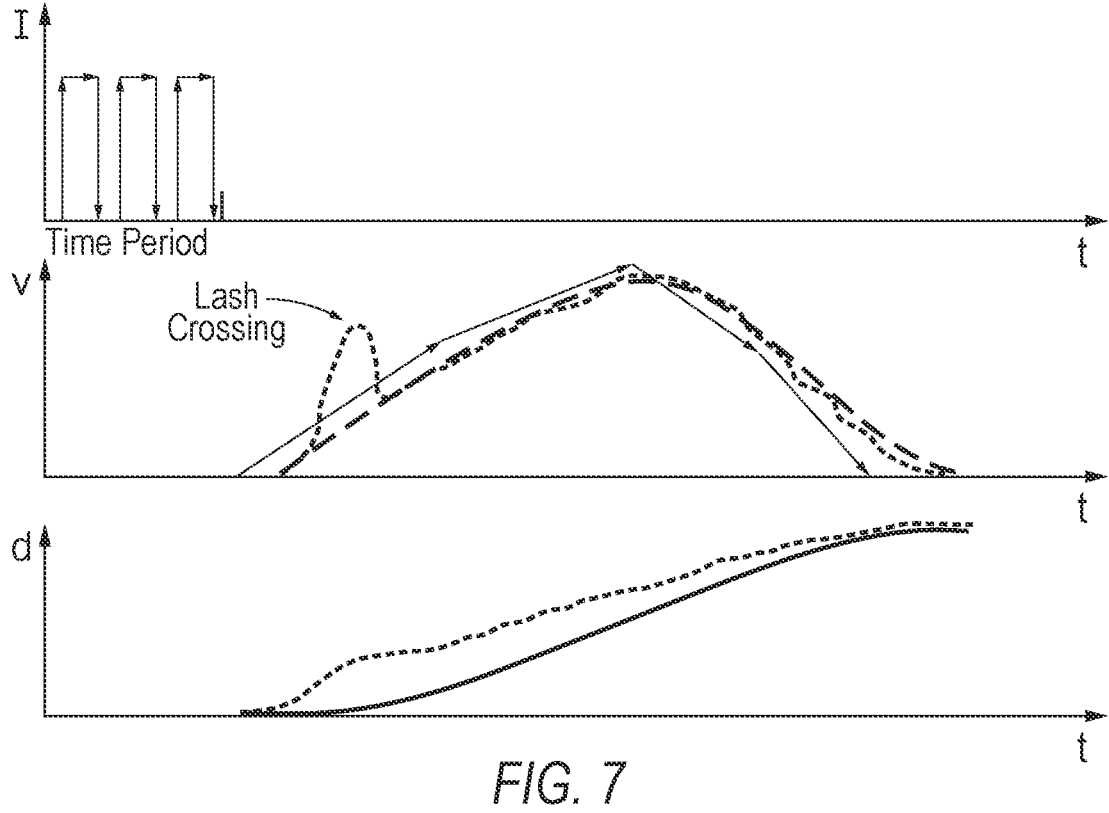
FIG. 7 includes example graphs of another example incremental-movement system showing entry of three discrete inputs to the incremental-movement system in a time period, the corresponding velocity of the vehicle under operation of the incremental-movement system, and distance traveled by the vehicle under operation of the incremental-movement system.

In the example in FIG. 7, which the top graph, as an example, shows three discrete inputs during the time period. In the middle graph of FIG. 7, the solid line depicts the ramp up and ramp down of vehicle velocity over time based on the measured travel distance to target movement in the incremental distance. In the middle graph of FIG. 7, the dotted lines shows a hypothetical example of the actual velocity of the vehicle 100 under the operation of the method 400. The lash crossing detected in the second wheel 145 is identified with the spike in the dotted line. The spike is exaggerated to illustrate the lash crossing for this description. In the bottom graph of FIG. 7, the solid line is the targeted distance traveled over time under the application of the velocity in the middle graph of FIG. 7. The dotted line in FIG. 7 shows a hypothetical example of the actual distance traveled by the vehicle 100 under the application of the velocity in the middle graph of FIG. 7. In such examples, the peak velocity (e.g., the peak velocity in the middle graph of FIG. 7) may be constant for each operation of the method 400 regardless of the number of discrete inputs. As an example, the peak velocity may be 0.1 kph.

The method 400 includes returning the vehicle 100 to a standstill at the end the incremental movement. The return to standstill may be caused by reducing power to the traction motors 110 and/or braking one or more wheels 145 of the vehicle 100 during movement of the vehicle 100 in the incremental distance to return the vehicle 100 to a standstill. After the vehicle 100 is returned to standstill, the method 400 returns to block 405. At that point, the method 400 can be repeated for another incremental movement of the vehicle 100. As other options, after returning to standstill, the vehicle 100 may be moved in other ways, e.g., with operation of the accelerator pedal.

In general, the computing systems and/or devices described may employ any of a number of computer operating systems, including, but by no means limited to, versions and/or varieties of the Ford Sync® application, App-Link/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer 105, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The adjectives "first" and "second" are used throughout this document as identifiers and are not intended to signify importance, order, or quantity. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A method comprising:
   receiving at least one discrete input within a predetermined time period from a human-machine interface while the vehicle is at a standstill; and
   in response to the at least one discrete input, moving the vehicle an incremental distance and returning the vehicle to a standstill;
   wherein moving the vehicle an incremental distance includes:
      commanding a first traction motor to rotate a first wheel of the vehicle while measuring traveled distance of a second wheel of the vehicle;
      then, identifying occurrence of gear lash in the rotation of the first wheel; and then, commanding a second traction motor to rotate the second wheel while measuring traveled distance of the first wheel.

2. The method as set forth in claim 1, further comprising determining that a steering angle of a steering wheel of the vehicle is outside of a predetermined range; and
   wherein moving the vehicle the incremental distance is based on the determination that the steering angle is outside of the predetermined range.

3. The method as set forth in claim 1, further comprising braking a wheel of the vehicle during movement of the vehicle in the incremental distance to return the vehicle to a standstill.

4. The method as set forth in claim 1, further comprising:
   receiving more than one discrete input within the predetermined time period; and
   calculating the length of the incremental distance based on the number of discrete inputs.

5. The method as set forth in claim 4, further comprising:
   determining a motor input for the first traction motor and/or the second traction motor based on the length of the incremental distance; and
   commanding the first traction motor and/or the second traction motor to rotate based on the motor input.

6. The method as set forth in claim 1, further comprising receiving more than one discrete input within the predetermined time period and accessing a lookup table to identify a length of the incremental distance based on the number of discrete inputs.

7. A system comprising:
   a computer having a processor and a memory storing instructions executable by the processor to:
   receive at least one discrete input within a predetermined time period from a human-machine interface while the vehicle is at a standstill; and
   in response to the at least one discrete input, move the vehicle an incremental distance and return the vehicle to a standstill;
   wherein the instruction to move the vehicle an incremental distance includes an instruction to:
      command a first traction motor to rotate a first wheel while measuring traveled distance of a second wheel;
      then, identify occurrence of lash in the rotation of the second wheel; and
      then, command a second traction motor to rotate the second wheel while measuring traveled distance of the first wheel.

8. The system as set forth in claim 7, wherein the memory stores instructions executable by the processor to:
   receive an indication that a steering angle of a steering wheel is outside of a predetermined range; and
   move the vehicle the incremental distance based on the indication that the steering angle is outside of the predetermined range.

9. The system as set forth in claim 7, wherein the memory stores instructions executable by the processor to brake a wheel of the vehicle during movement of the vehicle in the incremental distance to return the vehicle to a standstill.

10. The system as set forth in claim 7, wherein the memory stores instructions executable by the processor to:
   receive more than one discrete input within the predetermined time period; and
   calculate the length of the incremental distance based on the number of discrete inputs.

11. The system as set forth in claim 10, wherein the memory stores instructions executable by the processor to:

determine a motor input for the first traction motor and/or the second traction motor based on the length of the incremental distance; and command the first traction motor and/or the second traction motor to rotate based on the motor input.

12. The system as set forth in claim 7, wherein the memory stores instructions executable by the processor to:

receive more than one discrete input within the predetermined time period; and access a lookup table to identify a length of the incremental distance based on the number of discrete inputs.

13. A system comprising:

a computer having a processor and a memory storing instructions executable by the processor to:

receive at least one discrete input within a predetermined time period from a human-machine interface while the vehicle is at a standstill;

in response to the at least one discrete input, move the vehicle an incremental distance and returning the vehicle to a standstill; and determining that a steering angle of a steering wheel of the vehicle is outside of a predetermined range, wherein moving the vehicle the incremental distance is based on the determination that the steering angle is outside of the predetermined range.

14. The system as set forth in claim 13, wherein the memory stores instructions executable by the processor to:

command a traction motor to initiate movement in the incremental step from standstill;

measure traveled distance of the wheel of the vehicle from standstill; and return the vehicle to standstill based on measurement of the traveled distance of the wheel.

15. The system as set forth in claim 13, wherein the memory stores instructions executable by the processor to command a traction motor to move the vehicle in the incremental distance.

16. The system as set forth in claim 15, wherein the memory stores instructions executable by the processor to brake a wheel of the vehicle during movement of the vehicle in the incremental distance to return the vehicle to a standstill.

17. The system as set forth in claim 13, wherein the memory stores instructions executable by the processor to brake a wheel of the vehicle during movement of the vehicle in the incremental distance to return the vehicle to a standstill.

18. The system as set forth in claim 13, wherein the memory stores instructions executable by the processor to:

receive more than one discrete input within the predetermined time period; and calculate the length of the incremental distance based on the number of discrete inputs.

19. The system as set forth in claim 18, wherein the memory stores instructions executable by the processor to:

determine a motor input for at least one traction motor based on the length of the incremental distance; and command the at least one traction motor to rotate based on the motor input.

20. A method comprising:

receiving at least one discrete input within a predetermined time period from a human-machine interface while the vehicle is at a standstill; and determining that a steering angle of a steering wheel of the vehicle is outside of a predetermined range;

in response to the at least one discrete input and the determination that the steering angle is outside of the predetermined range, moving the vehicle an incremental distance and returning the vehicle to a standstill.

* * * * *